United States Patent
Kuno

(10) Patent No.: US 11,199,851 B2
(45) Date of Patent: Dec. 14, 2021

(54) MOVING BODY

(71) Applicant: EQUOS RESEARCH CO., LTD., Tokyo (JP)

(72) Inventor: Kazuhiro Kuno, Kariya (JP)

(73) Assignee: EQUOS RESEARCH CO., LTD., Tokyo (JP)

( * ) Notice: Subject to any disclaimer, the term of this patent is extended or adjusted under 35 U.S.C. 154(b) by 318 days.

(21) Appl. No.: 15/761,782

(22) PCT Filed: Oct. 27, 2016

(86) PCT No.: PCT/JP2016/081828
§ 371 (c)(1),
(2) Date: Mar. 20, 2018

(87) PCT Pub. No.: WO2017/115548
PCT Pub. Date: Jul. 6, 2017

(65) Prior Publication Data
US 2019/0064838 A1  Feb. 28, 2019

(30) Foreign Application Priority Data
Dec. 28, 2015  (JP) ............................. JP2015-256309

(51) Int. Cl.
*G05D 1/02* (2020.01)
*B25J 5/00* (2006.01)
(Continued)

(52) U.S. Cl.
CPC ............ *G05D 1/0246* (2013.01); *A45C 11/00* (2013.01); *B25J 5/00* (2013.01); *G05D 1/0088* (2013.01);
(Continued)

(58) Field of Classification Search
None
See application file for complete search history.

(56) References Cited

U.S. PATENT DOCUMENTS 9,798,935 B2 * 10/2017 Sandahl ............. G06K 9/00791
2006/0184274 A1 * 8/2006 Sakai ................... G05D 1/0246
700/245
(Continued)

FOREIGN PATENT DOCUMENTS

CN       1914009 A    2/2007
CN     101646532 A    2/2010
(Continued)

OTHER PUBLICATIONS

Jul. 3, 2018 International Preliminary Report on Patentability issued in International Patent Application No. PCT/JP2016/081828.
(Continued)

*Primary Examiner* — Nicholas K Wiltey
(74) *Attorney, Agent, or Firm* — Oliff PLC

(57) ABSTRACT

During movement control wherein a moving body tracks a user while in front of the user, a coordinate obtained from the torso of the user is used as the X coordinate of the position of the user, and among the position of the body of the user and the position of the feet of the user, the position which is closer to the moving body is used as the Y coordinate. Thus, the moving body is able to move to a target position in the left/right direction (the X coordinate) and the front/back direction (the Y coordinate) that is appropriate with respect to the user. Accordingly, the distance between the moving body and the user can be maintained appropriately, and movement control in front of the user and that is not an impediment to the user can be accomplished.

8 Claims, 10 Drawing Sheets

(51) Int. Cl.
  *A45C 11/00* (2006.01)
  *G05D 1/00* (2006.01)
  *A45C 5/14* (2006.01)
  *A45C 15/00* (2006.01)

(52) U.S. Cl.
  CPC .................. *G05D 1/02* (2013.01); *A45C 5/14* (2013.01); *A45C 15/00* (2013.01)

(56) References Cited

U.S. PATENT DOCUMENTS

| | | | |
|---|---|---|---|
| 2007/0241713 | A1 | 10/2007 | Yamamoto et al. |
| 2010/0138043 | A1 | 6/2010 | Kajima |
| 2012/0185095 | A1* | 7/2012 | Rosenstein .......... G05D 1/0227 700/259 |

FOREIGN PATENT DOCUMENTS

| | | |
|---|---|---|
| JP | 2002-255037 A | 9/2002 |
| JP | 2007-316924 A | 12/2007 |

OTHER PUBLICATIONS

Ma, Xudong et al. "Sensor Integration for Person Tracking and Following with Mobile Robot". 2008 IEEE/RSJ International Conference on Intelligent Robots and Systems, pp. 3254-3259, 2008.

Carballo, Alexander et al. "Fusion of Double Layered Multiple Laser Range Finders for People Detection from a Mobile Robot". Proceedings of IEEE International Conference on Multisensor Fusion and Integration for Intelligent Systems, pp. 677-682, 2008.

Jul. 8, 2019 Extended European Search Report issued in European Patent Application No. 16881528.0.

Dec. 6, 2016 International Search Report issued in International Patent Application No. PCT/JP2016/081828.

Apr. 27, 2020 Office Action issued in Chinese Patent Application No. 201680054021.9.

Jan. 6, 2021 Office Action issued in Chinese Patent Application No. 201680054021.9.

* cited by examiner

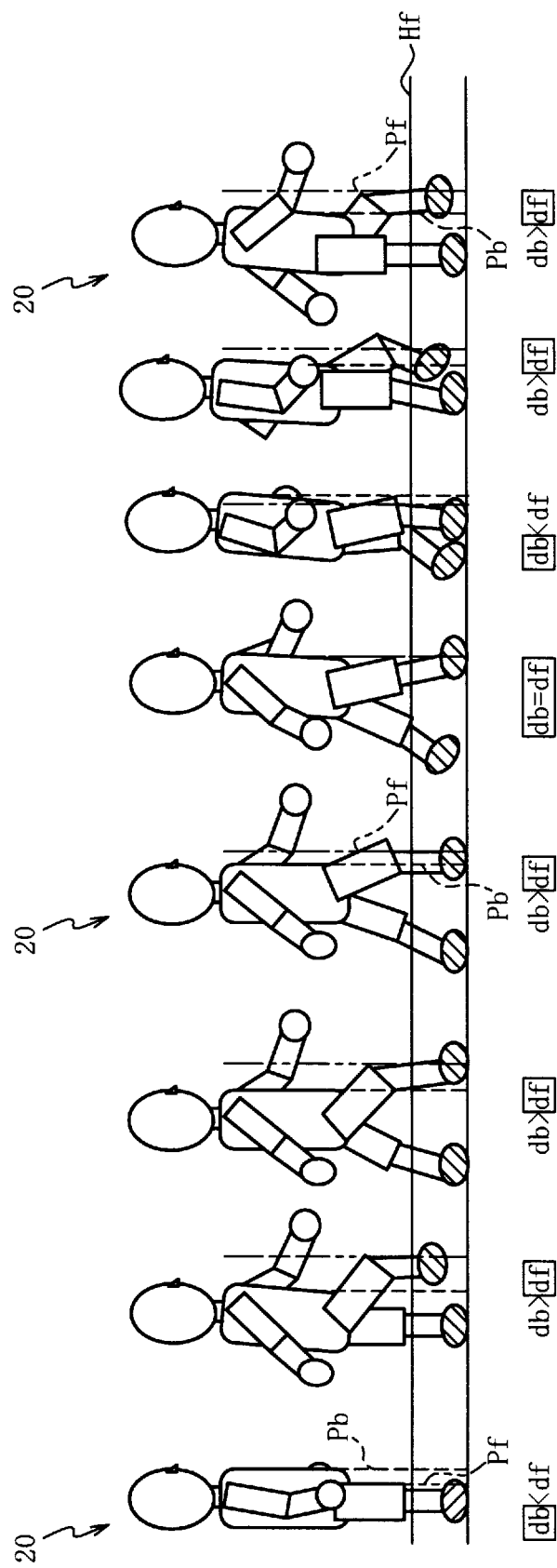

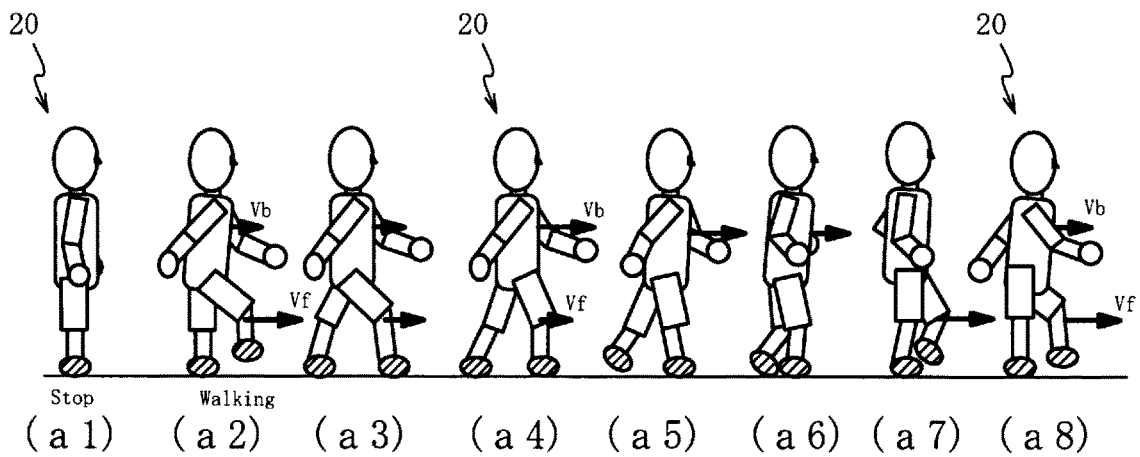
Fig. 6A
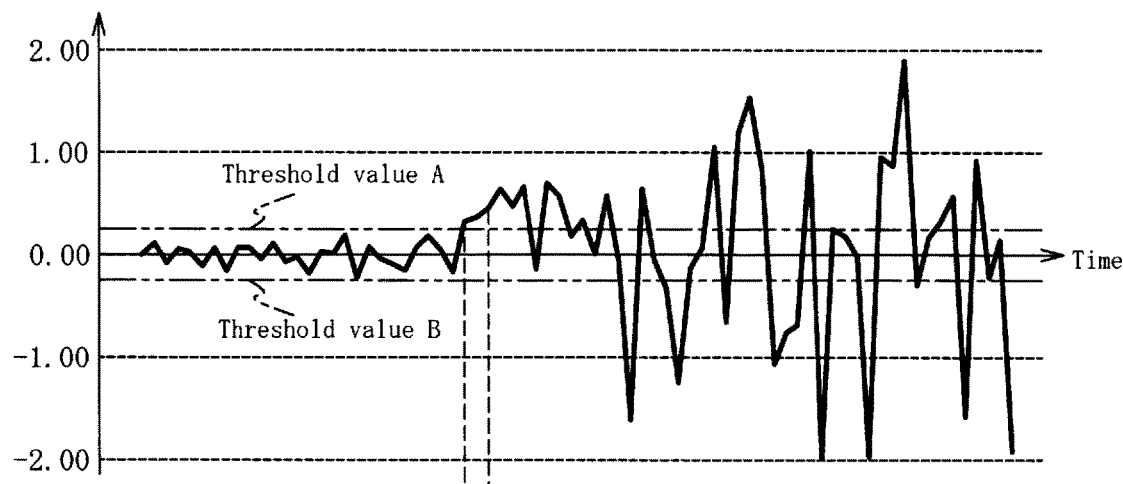
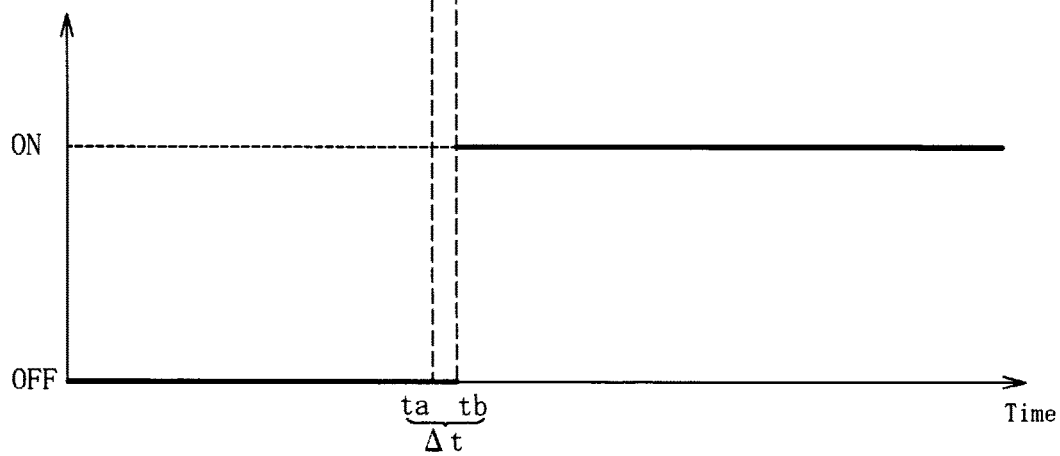
Fig. 6B

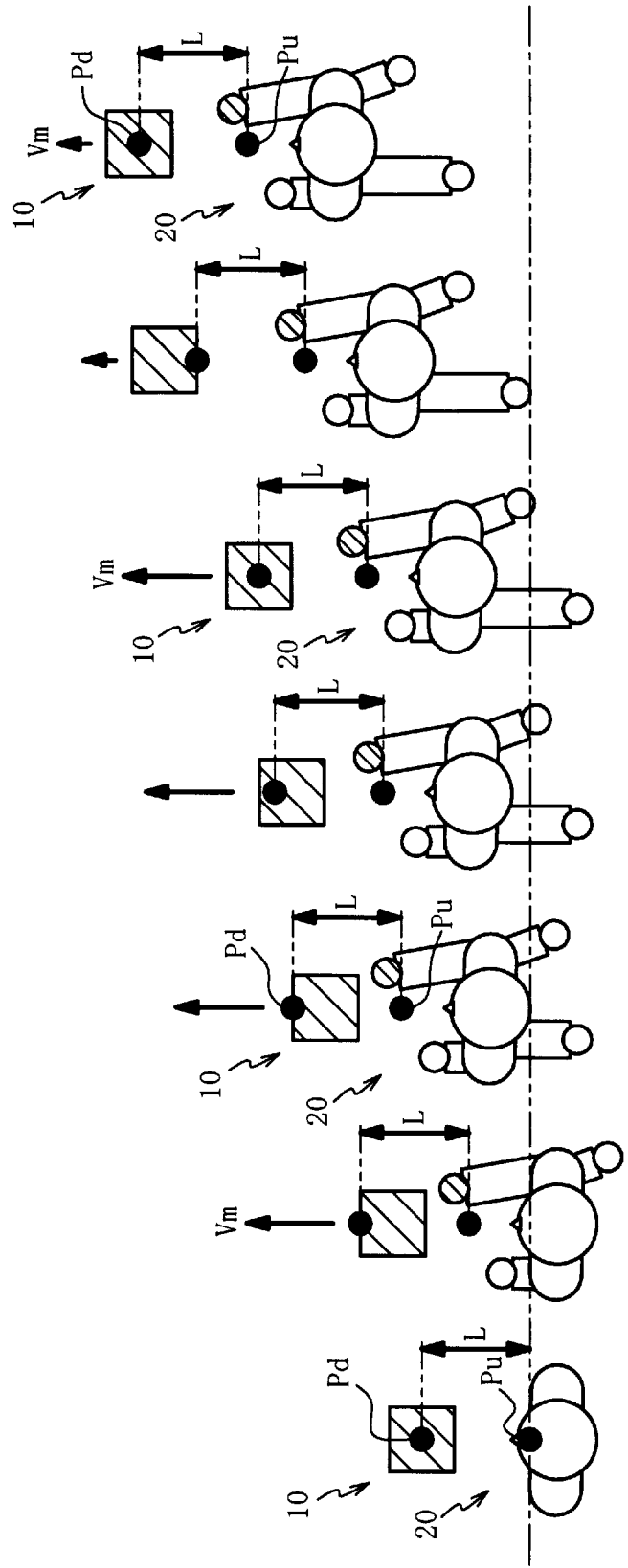

MOVING BODY

TECHNICAL FIELD

The present invention relates to a moving body, especially to a moving body capable of moving to an appropriate position in front of the user and following the user.

BACKGROUND ART

In Patent Literature 1, it is disclosed an autonomous moving device which determines a positional relation with the user based on surrounding circumstances and autonomously moves about the side of the user based on the determined positional relation. According to this autonomous moving device, it can be taken moving form other than tracking in addition to user tracking, therefore the moving device can move in front of the user while following the user.

CITATION LIST

Patent Literature

[PTL1] JP Laid-open Application Publication No. 2007-316924

SUMMARY OF INVENTION

Technical Problem

However, in the autonomous moving device disclosed in Patent Literature 1, although detection of the user is conducted, it is not considered which portions of the user are detected. In a case that a person generally walks, a leg moves in advance and thereafter torso followingly moves. Therefore, for example, in a case that detection of the user is conducted based on a chest position of the user, responsiveness of the moving device becomes bad. That is, in a case that the moving device is made move in front of the user while following the user, the moving device makes unnatural movements while a distance between the user and the moving device gets stuck or separates. On the other hand, while a person is walking, it may conceivably occur that the chest moves in advance from the leg. In this case, responsiveness of the moving device also remains bad by detecting the user only based on the leg.

The present invention has been done and possesses an object to provide a moving body capable of moving to an appropriate position against a user in front of the user and following the user.

Solution to Problem

To accomplish the above object, a moving body according to the present invention moves to an appropriate position in front of a user and follows the user, the moving body comprising:

movement device for moving the moving body;

user detection device for detecting the user by distinguishing between a leg and a torso of the user; and movement control device for controlling the movement device based on information of the torso and the leg detected by the user detection device and moving the moving body.

Advantageous Effects of Invention

According to the moving body of an exemplary embodiment, the torso and the leg of the user is distinctively detected by the user detection device and the movement device is controlled based on the detected information of the torso and the leg by the movement control device, thereby the moving body moves. Therefore, there is an effect that the moving body can move to an appropriate position against the user in front of the user and can follow the user.

According to the moving body of another exemplary embodiment, a following effect can be obtained. The movement control device controls a target position in a left-right direction of the moving body against the user based on the information of the torso detected by the user detection device. Further, the movement control device controls the target position in a front-back direction of the moving body against the user based on the information closer to the moving body within the torso and the leg detected by the user detection device. Therefore, there is an effect that the moving body can move to the target position with the appropriate left-right direction and the appropriate front-back direction against the user.

According to the moving body of another exemplary embodiment, a following effect can be obtained. The movement control device controls the target position in the left-right direction of the moving body against the user based on information of the direction of the torso detected by the user detection device. Therefore, there is an effect that the moving body can move to the target position in the appropriate left-right direction against the user.

According to the moving body of another exemplary embodiment, a following effect can be obtained. The movement control device controls a moving direction of the moving body based on the information of the torso detected by the user detection device and controls a moving distance of the moving body based on the information closer to the moving body within the torso and the leg detected by the user detection device. Therefore, there is an effect that the moving body can move in the appropriate moving direction and with the appropriate moving distance against the user.

According to the moving body of another exemplary embodiment, a following effect can be obtained. The movement control device controls the moving direction of the moving body against the user based on information of the direction of the torso detected by the user detection device. Therefore, there is an effect that the moving body can move to the appropriate moving direction against the user.

According to the moving body of another exemplary embodiment, a following effect can be obtained. The user detection device distinctly detects arms of the user, and the movement control device conducts movement control of the moving body without using information of the arms detected by the user detection device. Therefore, there is an effect that in a case that the user moves arms irrelevant of his movement, the moving body can move to an appropriate position against the user in front of the user and can follow to the user, without being misled by movement of arms.

According to the moving body of another exemplary embodiment, a following effect can be obtained. When the user starts to walk, the distance between the user and the moving body tends to become shorter. Therefore, at the time of starting to walk, it is required that the moving body is quickly moved than usual. According to claim 7, the user detection device detects starting to walk of the user, and the movement control device sets a moving speed of the moving body larger than a moving speed calculated based on information of a position of the moving body and the torso and the leg detected by the user detection device in a case that the starting to walk of the user is detected by the user detection device. Therefore, there is an effect that movement of the moving body can be smoothly conducted at the time of starting to walk of the user since the moving body quickly moves than usual at the time of starting to walk of the user.

According to the moving body of another exemplary embodiment, a following effect can be obtained. The user detection device detects the starting to walk of the user in a case that a differential value of position deviation of the torso and the leg of the user exceeds a predetermined first threshold value. Therefore, there is an effect that movement of the moving body can be smoothly conducted at the time of starting to walk of the user by exactly detecting the starting to walk of the user.

According to the moving body of another exemplary embodiment, a following effect can be obtained. The user detection device detects walking of the user, and the movement control device decelerates a moving speed of the moving body within a positive range in a case that the walking of the user is detected by the user detection device and a position of the moving body exceeds the target position calculated from information of the torso and the leg detected by the user detection device. Therefore, in a case that the moving body exceeds the target position in the walking state of the user due to progress too much of the moving body, progress too much of the moving body can be gradually solved while avoiding that the moving body reversely moves toward the user. Thus, there is an effect that movement of the moving body can be smoothly conducted.

According to the moving body of another exemplary embodiment, a following effect can be obtained. The user detection device detects the walking of the user in a case that the differential value of position deviation of the torso and the leg of the user exceeds a predetermined second threshold value for a predetermined period. Therefore, there is an effect that it can be exactly detected the walking state of the user and movement of the moving body in the walking state of the user can be smoothly conducted. Here, the "predetermined second threshold value" does not necessarily become the same value of the "predetermined first threshold value" and may become a different value.

BRIEF DESCRIPTION OF DRAWINGS

FIG. 5 is a view showing a distance relation between portions (torso, leg) of the user in a walking state of the user and the moving body.

FIG. 6(a) is a view showing movement amount of the torso position and movement amount of the leg position while the user is walking, and FIG. 6(b) is a graph showing a relation of transition of differential value of position deviation between the torso and the leg of the user and transition of flag state during walking.

FIG. 7 is a view showing a position relation of the moving body and the user and magnitude of moving speed of the moving body until the user starts to walk from a state that the user stops.

DESCRIPTION OF EMBODIMENTS

Figure 1B:
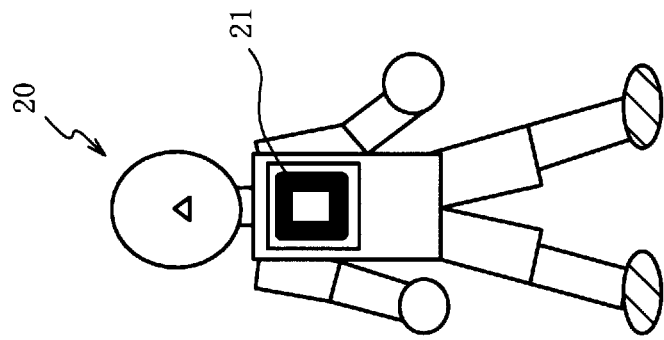
FIG. 1(b) is a front view of the user when seeing along an arrow Ib direction in FIG. 1(a).
Figure 1A:
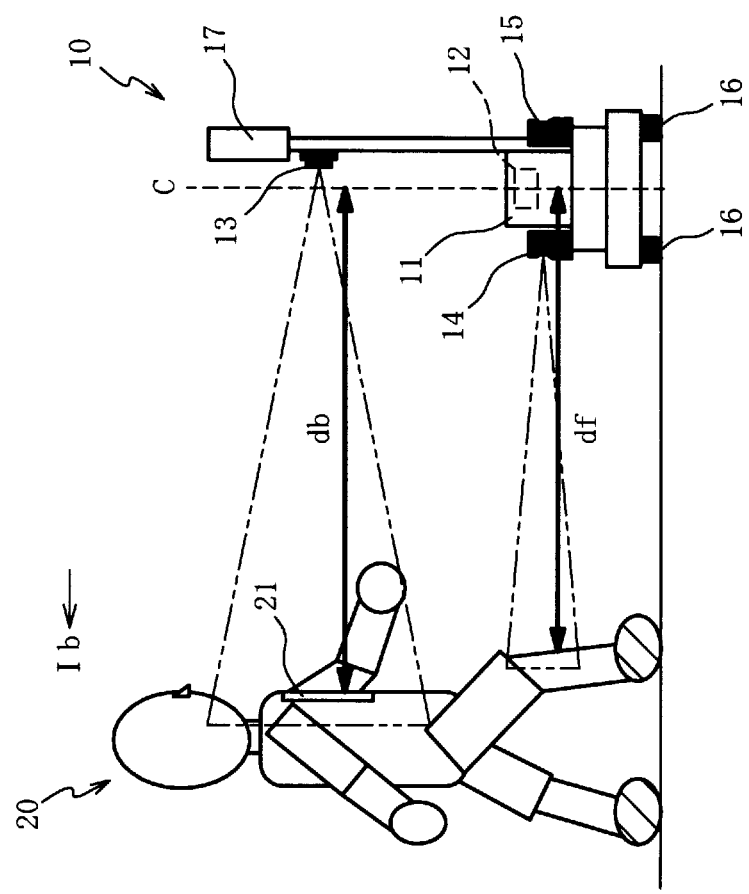
FIG. 1(a) is an external view of the moving body and the user in a first embodiment according to the present invention.

Hereinafter, a preferable embodiment of the present invention will be described with reference to the attached drawings. First, constitution of a moving body in the present embodiment will be described. FIG. 1(a) is an external view of the moving body 10 and the user 20 and FIG. 1(b) is a front view of the user 20 when seeing along an arrow Ib direction. The moving body 10 functions as a device capable of moving to an appropriate position against the user 20 in front of the user 20 and following the user 20.

Here, "front of the user 20" in which range the moving body 20 is moving is, for example, a front range of the user 20 and of 180° when centering the user 20. Or such range may be within a view range of the user 20. Further, a distance between the moving body 10 and the user 20 is made within a range of distance less than a distance set so as not to exceed a distance L (for example, about 120 cm) which is naturally to be secured at a point that the moving body 10 moves together with the user 20. This distance L to be secured is equal to a distance to a target position in movement control of the user 20 and the moving body 10.

As shown in FIG. 1(a), the moving body 10 has a main body portion 11, a torso detection sensor 13, a leg position detection sensor 14, a peripheral recognition sensor 15, wheels 16, a display portion 17 and a control portion 12. The main body 11 is formed in a substantially rectangular parallelepiped shape and the control portion 12 is installed within the main body 11. The torso detection sensor 13 is constituted from a camera obtaining torso image of the user 20 and is arranged at a height substantially as same as a height of center portion of the torso of the user 20.

The torso detection sensor 13 transmits an image including an AR marker 21 provided on the torso portion of the user 20 to the control portion 12. The control portion 12 analyzes the image obtained by the torso detection sensor 13 and calculates a distance db from a center C of the moving body 10 to the torso based on a size and inclination of the AR marker 21 within the image, thereby the control portion 12 calculates a position of the torso of the user 20. This torso position is a value indicated by a coordinate system in which the center C of the moving body 10 is set to an origin (0, 0) (hereinafter, called as "moving body coordinate system"). A triangle area drawn by two-dot chain lines in the upper side of FIG. 1(a) is a detection area of the torso detection sensor 13.

Here, since a position of the torso detection sensor 13 in a horizontal direction separates from the center C of the moving body 10, the control portion 12 calculates a distance db and coordinate of the torso by amending a distance difference. Further, it may be constituted that a position of the torso detection sensor 13 can be changed in up and down direction between the display portion 17 and the main body 11 and the torso portion can be appropriately obtained regardless of height of the user 20.

The leg position detection sensor 14 is constituted from a camera to obtain a leg image of the user 20 and installed at a height substantially as same as a height of shin of the user 20 between the torso detection sensor 13 and the wheels 16. Here, "leg" generally points a portion from "ankle" to "thigh". In the present embodiment, the leg position detection sensor 14 conducts "leg" detection by detecting "shin".

However, it is not necessarily limited to this. Instead of "shin", or with "shin", it may be conceivable that "leg" detection is conducted by detecting "knee" or "thigh" and the like. Further, it may be detected a top portion from "ankle". Such top portion from "ankle" is included within "leg" described in the present application.

The leg position detection sensor 14 transmits the leg image including the shin of the user 20 to the control portion 12. The control portion 12 analyzes the image obtained in the leg position detection sensor 14, calculates a distance df to the shin in each of the right leg and the left leg of the user 20 from the center C of the moving body 10 and calculates the coordinate of the position of the leg the distance df of which is smaller within the right leg and the left leg. This coordinate system is the moving body coordinate system, similarly to the position of the torso of the user 20. A triangle area drawn by the two-dot chain lines at the lower side indicates a detection range of the leg position detection sensor 14.

Here, since the position in the horizontal direction of the leg position detection sensor 14 separates from the center C of the moving body 10, the control portion 12 calculates the distance df and the coordinate of the torso by amending a distance difference. Further, it may be constituted that the position of the leg position detection sensor 14 can be changed in up and down direction and the image of the leg portion (especially, image of shin portion) can be appropriately obtained regardless of height of the user 20.

The peripheral recognition sensor 15 is constituted from a camera to obtain an image of peripheral state of the moving body 10 and the user 20 and is arranged at the opposite side of the leg position detection sensor 14. Since obstacles around the moving body 10 and persons approaching the moving body 10 can be recognized by the peripheral recognition sensor 15, the control portion 12 can move the moving body 10 in a direction that the user 20 can easily move while avoiding the obstacles and persons.

The wheels 16 are constituted from omnidirectional wheels capable of moving in all directions and installed under the lower portion of the moving body 10. Thereby, the moving body 10 can smoothly conduct movement in all directions. The wheels 16 rotate by motors (not shown) of a drive portion 35 and make the moving body 10 move. In the present embodiment, although three wheels 16 are provided, the number of the wheels 16 is not necessarily limited to three and appropriate number of wheels 16 can be adopted.

The display portion 17 has a display such as LCD and the like and is a device to transmit information to the user 20 by displaying on the display. Such display is provided on the upper part of the moving body 10. As shown in FIG. 1, the display of the display portion 17 is arranged on a surface facing to the user 20. That is, the display of the display portion 17 is arranged so as to face in the direction as same as the torso detection sensor 13 and the leg position detection sensor 14. The display of the display portion 17 is constituted as a touch panel. The display portion 17 inputs instruction from the user 20 to the moving body 10 through an HMI portion 36 and displays a state and moving route of the moving body 10.

The control portion 12 is a device to control each portion of the moving body 10 and determines moving speed and moving direction of the moving body 10 based on the information obtained from the torso detection sensor 13, the leg position detection sensor 14 and the peripheral recognition sensor 15. Based thereon, the control portion 12 conducts moving instruction against each wheel 16 through the drive portion 35.

The AR marker 21 is a marker to identify the position of the user 20 in a case that it is conducted image processing of the image obtained from the torso detection sensor 13 by the control portion 12. In the present embodiment, it is obtained a distance to the AR marker 21 based on the size of the marker within the image through the augmented reality technology.

As shown in FIG. 1(*b*), the AR marker 21 is provided on the front torso portion of the user 20. The torso detection sensor 13 makes the torso portion including the AR marker 21 image data. The control portion 12 calculates a distance between the moving body 10 and the user 20 from the size of the AR marker 21 within the obtained image data and calculates the coordinate of the user 20 in the moving body coordinate system mentioned above. Thereby, it can be obtained the torso position of the user 20 without making the user 20 have a distance meter and the like.

Figure 2:
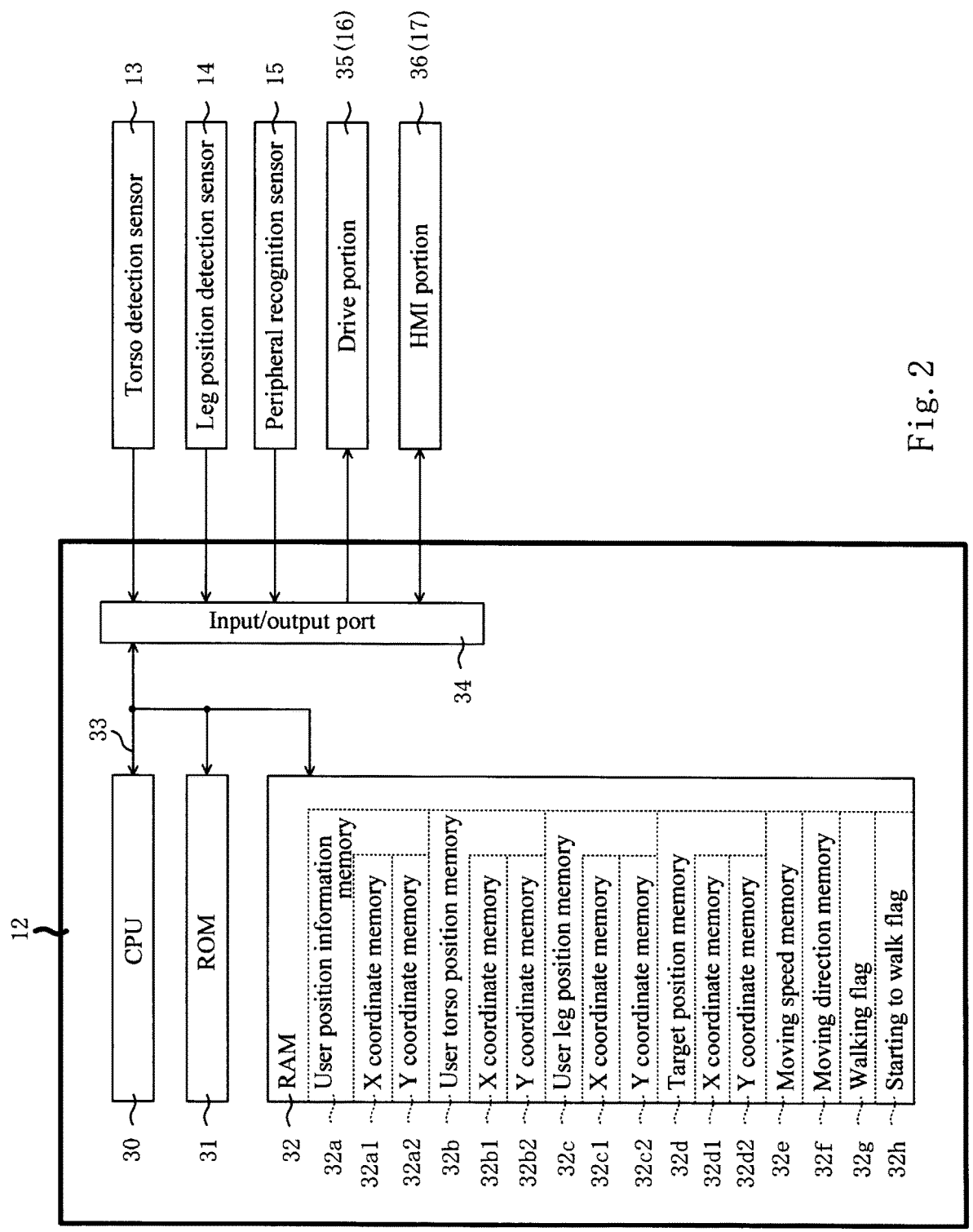
FIG. 2 is a block diagram showing an electrical constitution of the moving body in the first embodiment.

With reference to FIG. 2, an electrical constitution of the moving body 10 will be described. FIG. 2 is a block diagram showing an electrical constitution of the moving body 10 according to the first embodiment. The control portion 12 is a device to control each portion of the moving body 10 and, as shown in FIG. 2, the control portion 12 possesses a CPU 30, a ROM 31 and a RAM 32. These are respectively connected to an input/output port 34 through bus lines 33. Further, the torso detection sensor 13, the leg position detection sensor 14, the peripheral recognition sensor 15, the control portion 35 and the HMI portion 36 are respectively connected to the input/output port 34.

The CPU 30 is an arithmetic unit to control each portion connected through the bus lines 33. The ROM 31 is an unrewritable nonvolatile memory in which control programs executed by the CPU 30 (for example, main process of FIG. 3) and fixed value data and the like are stored.

The RAM 32 is a memory for rewritably storing various work data and flags and the like when the CPU 30 executes the control program. In the RAM 32, there are provided a user position information memory 32*a*, a user torso position memory 32*b*, a user leg position memory 32*c*, a target position memory 32*d*, a moving speed memory 32*e*, a moving direction memory 32*f*, a walking flag 32*g* and a starting to walk flag 32*h*.

The user position information memory 32*a* is a memory to store a position of the user 20 utilized in the moving control of the moving body 10 and has an X coordinate memory 32*a*1 and a Y coordinate memory 32*a*2. The coordinate system of either of the X coordinate memory 32*a*1 and the Y coordinate memory 32*a*2 is the moving body coordinate system mentioned above. When the control portion 12 is powered on, values of the X coordinate memory 32*a*1 and the Y coordinate memory 32*a*2 are respectively cleared to "0". After obtainment of the torso position by the torso detection sensor 13 and leg position by the leg position detection sensor 14 is conducted, the X coordinate of the torso position of the user 20 is stored in the X coordinate memory 32*a*1. In the Y coordinate memory 32*a*2, it is stored the Y coordinate with a shorter distance to the moving body 10 (that is, smaller one by comparing distance db with distance df) within the torso position and the leg position of the user 20.

The user torso position memory 32*b* is a memory to store a torso position of the user 20 and has an X coordinate memory 32*b*1 and a Y coordinate memory 32*b*2. The coordinate system of either of the X coordinate memory 32*b*1 and the Y coordinate memory 32*b*2 is the moving body coordinate system mentioned above. When the control portion 12 is powered on, values of the X coordinate memory 32*b*1 and the Y coordinate memory 32*b*2 are respectively cleared to "0". The X coordinate of the torso position of the user 20 calculated by analyzing the image obtained from the torso detection sensor 13 through the control portion 12 is stored in the X coordinate memory 32*b*1 and the Y coordinate of the torso position of the user 20 similarly obtained to the X coordinate is stored in the Y coordinate memory 32*b*2.

The user leg position memory 32*c* is a memory to store the leg position of the user 20 and has an X coordinate memory 32*c*1 and a Y coordinate memory 32*c*2. The coordinate system of the X coordinate memory 32*c*1 and the Y coordinate memory 32*c*2 is the moving body coordinate system mentioned above. When the control portion 12 is powered on, values of the X coordinate memory 32*c*1 and the Y coordinate memory 32*c*2 are respectively cleared to "0". In the user leg position memory 32*c*, the X coordinate of the leg position of the user 20 calculated by analyzing the image obtained from the leg detection sensor 14 through the control portion 12 is stored in the X coordinate memory 32*c*1 and the Y coordinate of the leg position of the user 20 similarly obtained to the X coordinate is stored in the Y coordinate memory 32*c*2.

The target position memory 32*d* is a memory to store the target position in the moving control of the moving body 10 and has an X coordinate memory 32*d*1 and a Y coordinate memory 32*d*2. The coordinate system of the X coordinate memory 32*d*1 and the Y coordinate memory 32*d*2 is the moving body coordinate system mentioned above. When the control portion 12 is powered on, values of the X coordinate memory 32*d*1 and the Y coordinate memory 32*d*2 are respectively cleared to "0". After the position of user 20 is obtained, the X coordinate of the target position in the moving control of the moving body 10 calculated from the value of the user position information memory 32*a* through the control portion 12 is stored in the X coordinate memory 32*d*1 and the Y coordinate of the target position similarly obtained to the X coordinate is stored in the Y coordinate memory 32*d*2.

The moving speed memory 32*e* is a memory to store the moving speed for moving the moving body 10 to the target position. When the control portion 12 is powered on, value of the moving speed memory 32*e* is cleared to "0". Although described in detail hereinafter, the moving speed calculated from the target position memory 32*d* by the control portion 12 is stored in the moving speed memory 32*e*.

The moving direction memory 32*f* is a memory to store the moving direction for moving the moving body 10 to the target position. The coordinate system of the moving direction memory 32*f* is the moving body coordinate system mentioned above and the unit thereof is radian. When the control portion 12 is powered on, value of the moving direction memory 32*f* is cleared to "0". Although described in detail hereinafter, the moving direction calculated from the target position memory 32*d* by the control portion 12 is stored in the moving direction memory 32*f*.

The walking flag 32*g* is a flag to indicate that the user 20 is walking. When the control portion 12 is powered on, the walking flag 32*g* is set to OFF. In a case that a state in which the differential value of the torso position and the leg position of the user 20 exceeds a threshold value A or is less than a threshold value B continues for Δt time, it is judged that the user 20 is walking and the walking flag 32*g* is set to ON (see FIG. 6(*b*)).

The starting to walk flag 32*h* is a flag to indicate that the user 20 is walking from a stoppage state and is set to OFF when the control portion 12 is powered on. At a timing that the user 20 is walking from the stoppage state, that is, when the value of the walking flag 32*g* becomes ON from OFF, the starting to walk flag 32*h* is set to ON. In a case that the distance between the moving body 10 and the user 20 exceeds the predetermined distance L to be secured, the starting to walk flag 32*h* is made OFF.

The drive portion 35 is a device to control the moving body 10 by conducting moving action and is constituted from the wheels 16 and the motors (not shown) becoming driving source of the wheels 16 and the like. When a moving signal is input to the drive portion 35 from the control portion 12, the motor rotates based on the input moving signal and the wheels 16 are driven as rotation of the motor becomes motive power, thereby the moving body 10 is operated.

The HMI portion 36 is an interface which outputs information to the user 20 and through which the user 20 inputs instruction and is constituted from the display of the display portion 17 mentioned above and the touch panel. The HMI portion 36 outputs information to the display of the display portion 17 corresponding to a control signal input from the control portion 12. On the other hand, in a case that instruction is input to the HMI portion 36 through the touch panel of the display portion 17 by the user 20, the HMI portion 36 outputs the control signal corresponding to such input to the control portion 12. Here, a speaker to output voice or microphone to input voice may be provided in the HMI portion 36.

Figure 3:
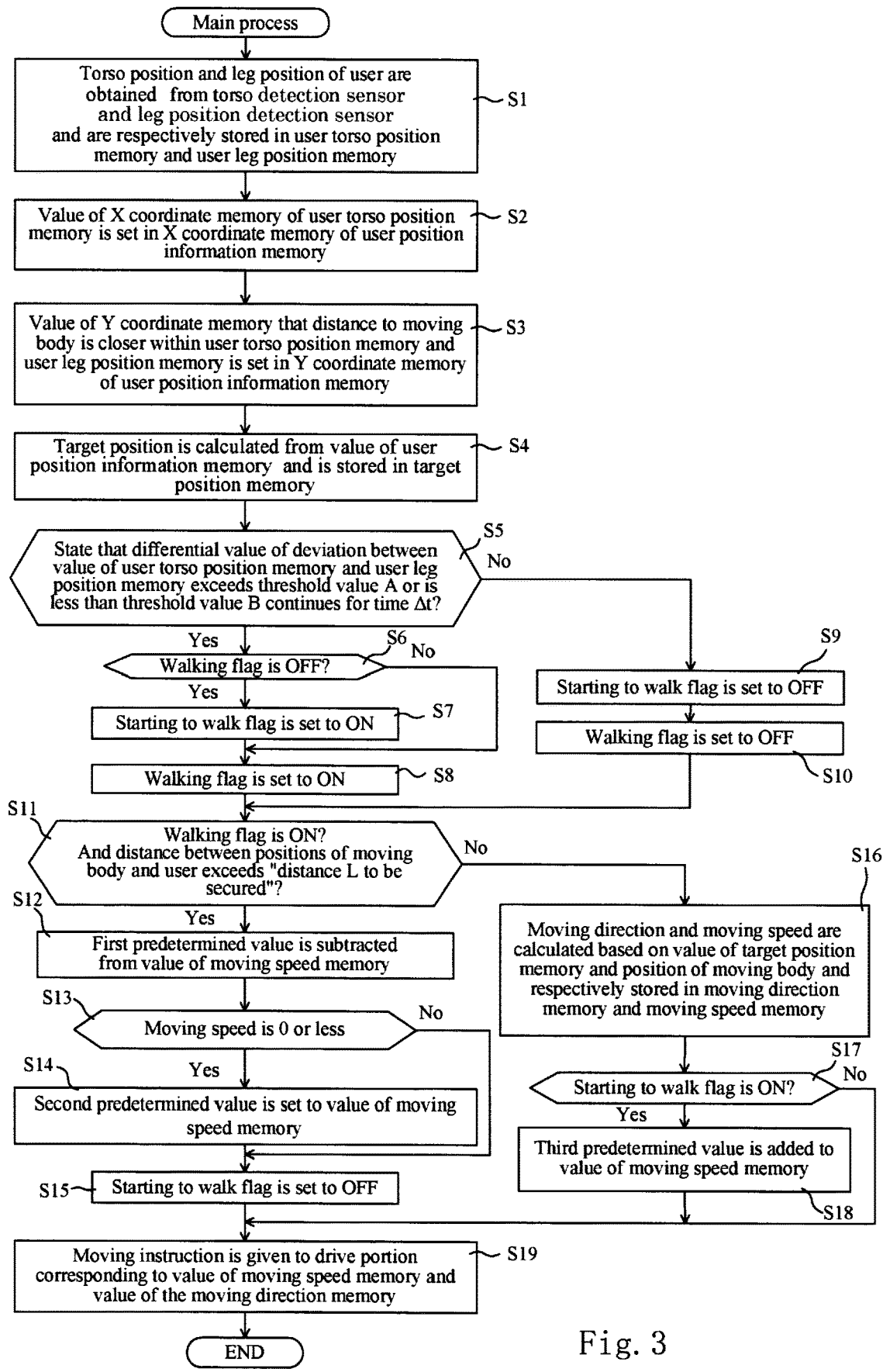
FIG. 3 is a flowchart of main process in the first embodiment.

Next, with reference to FIGS. 3 to 7, the processes executed by the CPU 30 of the control portion 12 will be described. FIG. 3 is a flowchart of main process in the first embodiment. By the main process, the moving direction and the moving speed of the moving body 10 are determined and, based thereon, a moving instruction is given to the drive portion 35. The main process is repeatedly executed through interval interrupt processing every 100 ms.

In the main process, at first, the torso position and the leg position of the user 20 are respectively obtained from the torso detection sensor 13 and the leg position detection sensor 14 (S1).

Obtaining method of the torso position of the user 20 will be concretely described. The image of the torso portion of the user 20 is obtained from the torso detection sensor 13 and is transmitted to the control portion 12. The control portion 12 analyzes the obtained image and detects the AR marker 21 provided on the torso of the user 20. Based on the size of the detected AR marker 21 within the image, coordinates in the X axis direction and Y axis direction of the AR marker 21 are calculated. The calculated coordinate in the X axis direction and the calculated coordinate in the Y axis direction are respectively stored in the X coordinate memory 32*b*1 and in the Y coordinate memory 32*b*2 of the user torso position memory 32*b*.

Obtaining method of the leg position of the user 20 will be concretely described. The image of the leg portion of the user 20 is obtained from the leg position detection sensor 14 and is transmitted to the control portion 12. The control portion 12 analyzes the obtained image and calculates the distance df to the respective shin of the right leg and the left leg of the user 20 from the center C of the moving body 10. Further, the coordinate of the leg position in which the distance df is smaller within the right leg and the left leg is made the coordinate of the leg position. The coordinate in the X axis direction and the coordinate in the Y axis direction of the above leg position are respectively stored in the X coordinate memory 32*c*1 and in the Y coordinate memory 32*c*2 of the user leg position memory 32*c*. Here, the image analyzing method to detect the shin may be an edge detection method or a method utilizing a pattern matching method.

Next, the value of the X coordinate memory 32b1 of the user torso position memory 32b is set in the X coordinate memory 32a1 of the user position information memory 32a (S2). The value of the Y coordinate memory (that is, Y coordinate memory 32b2 or Y coordinate memory 32c2) that the distance to the moving body 10 is smaller within the user torso position memory 32b and the user leg position memory 32c is set in the Y coordinate memory 32a2 of the user position information memory 32a (S3).

Figure 4:
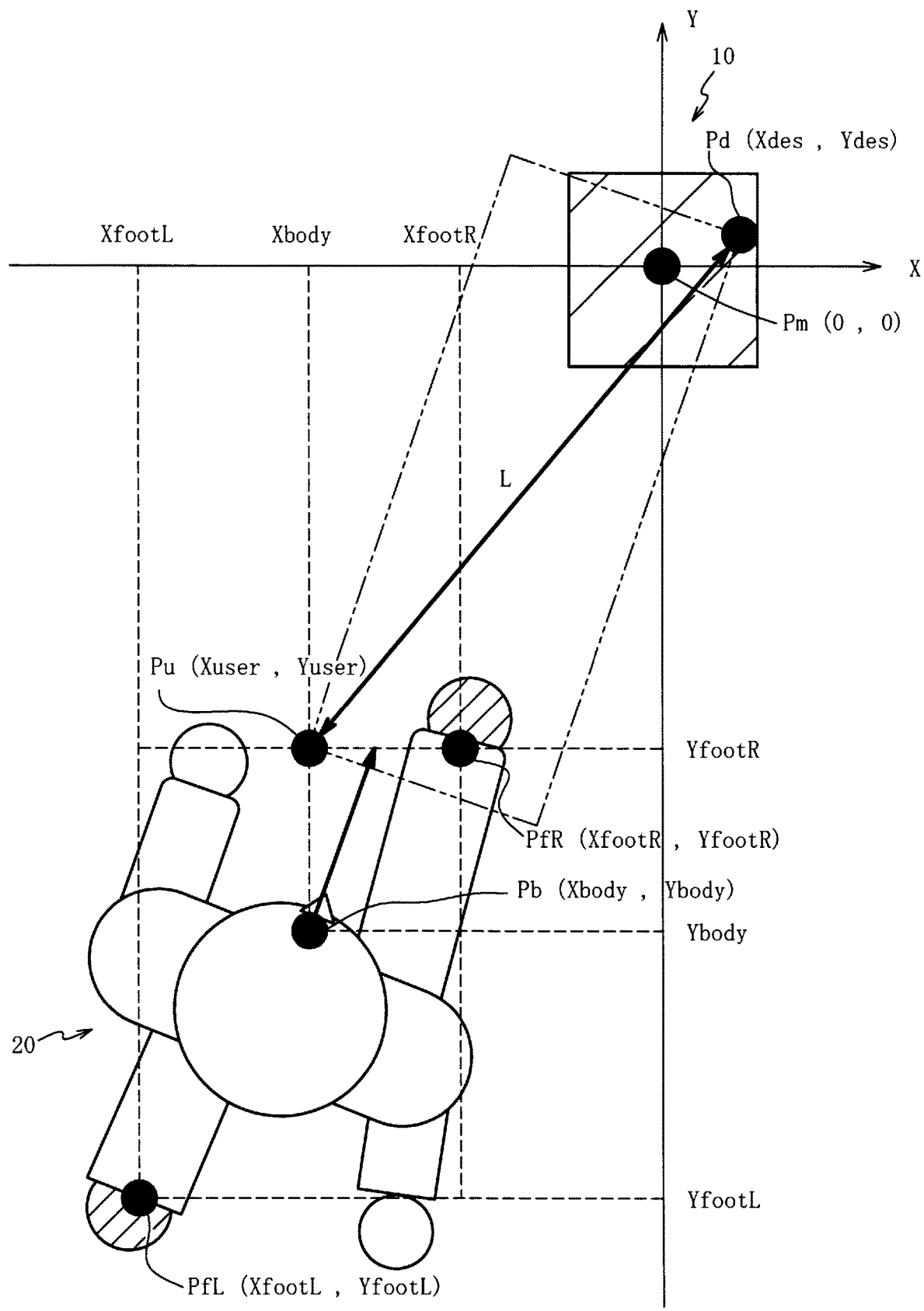
FIG. 4 is a view to explain a user position determined in steps S2, S3.

Here, with reference to FIG. 4, the position setting process of the user 20 (S2, S3) will be described. FIG. 4 is a view to explain the position of the user 20 determined in steps S2, S3. The moving body 10 and the user 20 at some point are indicated on the moving body coordinate system. The center point of the position of the moving body 10 is represented by Pm (0, 0) and the torso position of the user 20 is represented by Pb (Xbody, Ybody). On the other hand, among leg positions of the user 20, the right leg position is represented by PfR (XfootR, YfootR) and the left leg position is represented by PfL (XfootL, YfootL). The position of the user 20 is represented by Pu (Xuser, Yuser) and the target position is represented by Pd (Xdes, Ydes).

First, by the process S2, the value of the X coordinate memory 32b1 of the user torso position memory 32b is set in the X coordinate memory 32a1 of the user position information memory 32a. In the present embodiment, the reason because the value of the X coordinate memory 32b1 of the user torso position memory 32b is usually set in the X coordinate memory 32a1 of the user position information memory 32a is to restrain blur in the X axis direction of the moving body 10. Provisionally, supposed that the X coordinate that the distance between three coordinates of the torso position of the user 20, the right leg and the left leg and the moving body 10 is the smallest is Xuser, the X coordinate of the user 20 changes XfootR→Xbody→XfootL→Xbody→XfootR . . . based on walking state of the user 20. Since the moving direction of the moving body 10 is calculated based on the position of the user 20, in a case that the value of Xuser changed to the left from the right and to the right from the left, the moving direction of the moving body 10 changes to the left from the right and to the right from the left. Therefore, movement becomes like "meandering driving". Thus, the moving control of the moving body 10 can be made more stable by utilizing the position of the torso movement amount of which is stable in the X axis direction as the X coordinate of the position of the user 20 other than the position of the leg which switches left and right alternately.

Next, at the time of FIG. 4, the coordinate that the distance to the moving body 10 is the smallest is the coordinate of the right leg (XfootR, YfootR) among three coordinates of the torso position, the right leg and the left leg of the user 20. Therefore, in the process of S3, the value of the Y coordinate of the right leg, that is, the value of the Y coordinate memory 32c2 of the user leg position memory 32c is set in the Y coordinate memory 32a2 of the user position information memory 32a. The portion of the user 20 (torso, right leg, left leg) that the distance to the moving body 10 becomes the smallest is different based on the walking state of the user 20, thus, Yuser changes based on the walking state. This will be described in FIG. 5.

FIG. 5 is a view showing a relation of distance between the torso position and the leg position of the user 20 and the moving body 10 in a walking state of the user 20. In each walking state of the user 20 of FIG. 5(a) to (h), a relation between the distance db between the torso position of the user 20 and the moving body 10 and the distance df between the leg position of the user 20 and the moving body 10 is indicated. A solid line Hf near the leg of the user 20 indicates the position of the leg (about height position of shin) obtained through the leg position detection sensor 14. The torso position of the user 20 is represented by Pb and the leg position is represented by Pf, respectively. Here, the Pf is the position that the distance to the moving body 10 is smaller within the PfR and PfL in FIG. 4. The distance db is a distance between the center C of the moving body 10 and Pb and the distance df is a distance between the center C of the moving body 10 and Pf. Relations between magnitude of the distance db and the distance df are indicated in the lower part of figure. Until the user 20 raises the leg, takes a step and finishes taking steps (FIGS. 5(b) to 5(d), 5(g), 5(h)), the distance df is smaller than the distance db (distance db>distance df). On the other hand, in a case that the user 20 stops (FIG. 5(a)) or in a case that the right leg and the left leg replaces (FIG. 5(f)), the distance db is smaller than the distance df (distance db<distance df).

As mentioned above, the portion of the user 20 (torso, legs) that the distance to the moving body 10 becomes the smallest based on the walking state changes from moment to moment. Thus, in the present embodiment, the position that the distance to the moving body 10 becomes the smallest within the torso position and the leg position is set in the Y coordinate memory 32a2 of the user position information memory 32a. Thereby, since the distance in the Y axis direction between the user 20 and the moving body 10 can be appropriately secured, moving control of the moving body 10 can be conducted at the position not to get in the way for the user 20 in front of the user 20.

Description returns to FIG. 3. After the process S3, the target position is calculated from the value of the user position information memory 32a and is stored in the target position memory 32d (S4). The target position is set to a point separate by the predetermined distance L from the user position. The coordinate (Xdes, Ydes) corresponding to the diagonal of the position Pu of the user 20 in the rectangle formed by two-dot chain lines in FIG. 4 becomes the target position Pd. This position is calculated from the value of the user position information memory 32a and is stored in the target position memory 32d. In FIG. 4, although the target position is provided in the right forward position of the user 20, it is not necessarily limited to this. The target position may be provided in the other place such as the left forward position of the user 20.

After the process of S4 in FIG. 3, it is confirmed whether or not it continues for the time Δt the state that the differential value of deviation between the value of the user torso position memory 32b and the value of the user leg position memory 32c exceeds the threshold value A or is less than the threshold value B (S5). As for this judgement process, such process will be described by using FIG. 6.

FIG. 6(a) is a view showing the moving amount of the torso position and the moving amount of the leg position when the user 20 is walking and FIG. 6(b) is a graph showing a relation between transition of the differential value of the position deviation of the torso and the leg of the user 20 and transition of the state in the walking flag 32g. In FIG. 6(a), Vb indicates moving amount at the torso position of the user 20 and Vf indicates moving amount at the leg position. In FIG. 6(a1) showing a state that the user 20 stops, both the torso position and the leg position of the user 20 do not move. On the contrary, in Figs. after FIG. 6(a2) showing a walking state, at least either one of the torso position and the leg position of the user 20 moves.

The torso position and the leg position do not move with the same moving amount while the user 20 is walking, therefore the differential value (difference with previous value) of the position deviation of the torso position and the leg position is obtained, and in a case that it continues for the time Δt a state that such differential value exceeds the threshold value A or is less than the threshold value B, it is judged that the user 20 is in the walking state. The reason to utilize the differential value of the position deviation is that it is not suitable for judging the walking state since the position deviation increases due to that the torso is inclined when stopping or the leg is retained in raising state when the position deviation is utilized. By utilizing the differential value of the position deviation, difference of the deviation from the previous value, that is, the moving amount from the previous value can be obtained.

FIG. 6(b) indicates a relation between transition of the differential value of the position deviation of the torso and the leg of the user 20 (graph in upper stage) and transition of the state in the walking flag 32g (graph in lower stage). Two dot-chain lines in the graph of the upper stage indicate the threshold value A and the threshold value B. At the time ta, the differential value of the position deviation of the torso position and the leg position of the user 20 exceeds the threshold value A. Further, it continues after the time tb a state that this differential value exceeds the threshold value A. Difference between the time ta and the time tb is the Δt. Thereby, the control portion 12 judges that the user 20 is in the walking state, and as shown in the graph of the lower stage in FIG. 6(b), the walking flag 32g is changed to ON from OFF.

As mentioned above, in a case that it continues for the time Δt a state that the differential value of the position deviation of the torso and the leg of the user 20 exceeds the threshold value A or is less than the threshold value B, the control portion 12 judges that the user 20 is in the walking state. Thereby, the walking state of the user 20 can be exactly detected and movement of the moving body 10 during the walking state can be smoothly conducted. Further, the walking state can be detected without adding a motion sensor to the moving body 10 and making the user 20 have a device to detect movement such as accelerometer.

Description returns to FIG. 3. Based on a result in S5, if judged the walking state (S5: Yes), it is confirmed whether or not the walking flag 32g is OFF (S6). If the walking flag 32g is OFF (S6: Yes), the starting to walk flag 32h is set to ON (S7). Thereby, starting to walk of the user 20 can be exactly detected and movement of the moving body 10 can be smoothly done at the time of starting to walk. On the other hand, if the walking flag 32g is ON (S6: No), the process S7 is skipped. After the processes of S6 and S7, the walking flag 32g is set to ON (S8).

Based on a result of S5, if it is judged that the user 20 is not in the walking state (S5: No), the starting to walk flag 32h is set to OFF (S9), and thereafter, the walking flag 32g is set to OFF (S10).

After the processes of S8 and S10, it is confirmed whether or not the walking flag 32g is ON and the distance between the positions of the moving body 10 and the user 20 (that is, value of user position information memory 32a) exceeds "distance L to be secured" (S11). That is, based on the center C (0, 0) of the moving body 10 and the value of the user position information memory 32a, the distance between the moving body 10 and the user 20 is calculated and such distance is compared with the distance L to be secured. Here, "distance L to be secured" is a natural distance between the user 20 and the moving body 10 at the point that the moving body 10 moves together with the user 20 and is a distance between the user 20 and the target position.

In a case that the walking flag 32g is ON and the distance between the positions of the moving body 10 and the user 20 exceeds the "distance L to be secured" (S11: Yes), a first predetermined value is subtracted from the value of the moving speed memory 32e (S12). Based on the subtraction result, if the value of the moving speed memory 32e becomes 0 or less (S13: Yes), a second predetermined value is set to the value of the moving speed memory 32e (S14). On the other hand, if the value of the moving speed memory 32e is larger than 0 (S13: No), the process of S14 is skipped. After the processes of S13 and S14, the starting to walk flag 32h is set to OFF (S15). It will be described hereinafter the reason that the first predetermined value is subtracted from the value of the moving speed memory 32e and the starting to walk flag 32h is set to OFF.

On the other hand, if the distance between the positions of the moving body 10 and the user 20 does not exceed the "distance L to be secured" (S11: No), the moving speed and the moving direction of the moving body 10 are calculated based on the present position of the moving body 10 and the value of the target position memory 32d and are respectively stored in the moving speed memory 32e and the moving direction memory 32f (S16). Concretely, the distance between the present position of the moving body 10 and the target position (Xdes, Ydes) and the deviation of angle are calculated and the moving speed and the moving direction necessary to eliminate the deviation of distance and angle are respectively calculated. As one example of calculation method, it can be raised PID control in which the deviations of distance and angle are made parameters and proportional element (P), integral element (I) and differential element (D) are combined, and based on the PID control, the moving speed and the moving direction are obtained.

After the process of S16, if the starting to walk flag 32h is ON (S17: Yes), a third predetermined value is added to the value of the moving speed memory 32e (S18). The reason to add the third predetermined value to the value of the moving speed memory 32e will be described hereinafter.

After the process of S15 or S18, moving instruction is output to the drive portion 35 corresponding to the value of the moving speed memory 32e calculated in S12, S14, S16, S18 and the value of the moving direction memory 32f (S19). Thereby, the moving body 10 moves toward the target position.

Here, with reference to FIG. 7, it will be described subtraction of the first predetermined value and addition of the second predetermined value against the moving speed memory 32e in S12, S18. FIG. 7 is a view showing transition of the moving body 10 and the user 20 until the user 20 starts to walk from the state that the user 20 stops. Pd indicates the target position of the moving body 10 and Pu indicates the position of the user 20. Further, Vm indicates the moving speed of the moving body 10. FIG. 7(a) indicates a state that the user 20 stops, and as going to FIG. 7(g) from FIG. 7(a), it is indicated a state that the user 20 starts walking action. In a case that the moving body 10 and the user 20 stop (FIG. 7(a)), the moving body 10 and the user 20 exist within the distance L.

During a period of the user 20 starting to walk as shown in FIGS. 7(b) to 7(d), the Vm of the moving body 10 is smaller than the speed of the user 20. This is because some time is required until walking state of the user 20 is detected, the moving speed is calculated and the drive portion 35 is operated and a time is also required until the moving body 10 reaches walking speed of the user 20 after the drive portion 35 is operated. There, in the present embodiment, during the period that the user 20 starts to walk, the third predetermined value is added to moving speed calculated in S16 (S18), the moving speed of the moving body 10 is increased than usual. Thereby, the moving body 10 can quickly move than usual at the time that the user 20 starts to walk, therefore movement of the moving body 10 can be smoothly conducted at the time that the user 20 starts to walk. Here, as the third predetermined value, for example, the value of ½ of the moving speed of the moving body 10 can be exemplified.

On the other hand, during the period of starting to walk, in a case that it continues the state in which the third predetermined value is added to the moving speed, the distance between the moving body 10 and the user 20 exceeds the distance L to be secured (FIG. 7(f)). That is, the moving body 10 becomes too far away from the user 20. Thus, in a case that the user 20 is in the walking state and the distance between the user 20 and the moving body 10 exceeds the distance L to be secured (S11: Yes), the moving speed of the moving body 10 is subtracted by the first predetermined value (S12). Walking speed of the user 20 does not change. Thereby, the distance between the moving body 10 and the user 20 gets smaller little by little. Therefore, the moving body 10 can be brought closer to the position of the distance L to be secured against the user 20 and the moving body 10 can be smoothly followed in front of the user 20 while substantially retaining the distance L to be secured. Here, as the first predetermined value, for example, it can be exemplified a value inversely calculated from deceleration according to which the moving body 10 is stopped after 0.5 seconds.

Here, based on a result that the moving speed of the moving body 10 is subtracted by the first predetermined value (S12), if the moving speed becomes 0 or less, the moving speed of the moving body 10 is set to the second predetermined value (positive value). Thereby, progress too much of the moving body 10 can be gradually solved while avoiding that the moving body 10 reversely moves toward the user 20. Here, as the second predetermined value, for example, it can be exemplified a value according to which the distance between the moving body 10 and the user 20 becomes the distance L to be secured after 0.5 seconds.

Further, in a case that the user 20 is in the walking state and the distance between the user 20 and the moving body 10 exceeds the distance L to be secured (S11: Yes), it concludes that the period of starting to walk (that is, the period for adding the third predetermined value) is already terminated. Therefore, in this case, the starting to walk flag 32h is set to OFF by the process of S15.

As described in the above, according to the moving body 10, in the movement control following the user 20 in front of the user 20, the X coordinate of the position of the user 20 utilizes the coordinate obtained from the torso of the user 20 and the Y coordinate of the position of the user 20 utilizes either one coordinate which is closer to the moving body 10 within the torso position and the leg position of the user 20. Thereby, the moving body 10 can move to the target position with the appropriate left-right direction (X coordinate) and the front-back direction (Y coordinate) against the user 20. Therefore, the distance between the moving body 10 and the user 20 can be appropriately retained and movement control can be done so that the moving body 10 does not get in the way against the user 20 in front of the user 20.

Next, with reference to FIGS. 8 to 10, it will be described movement control of the moving body 10 in the second embodiment. In the first embodiment mentioned above, the value of the X coordinate memory 32a1 of the user position information memory 32a utilizes the value of the torso position of the user 20 and the value of the Y coordinate memory 32a2 utilizes either one value of the position which is closer to the moving body 10 within the torso position and the leg position of the user 20. On the contrary, in the second embodiment, both of the values of the X coordinate memory 32a1 and the Y coordinate memory 32a2 of the user position information memory 32a utilizes the coordinate obtained by rotating and moving either one coordinate closer to the moving body 10 within the torso position and the leg position of the user 20 toward the direction to which the user 20 faces. Here, to the same portions as those in the first embodiment mentioned above, the same references are attached and description thereof will be omitted. Only different portions from the first embodiment will be described.

Figure 8:
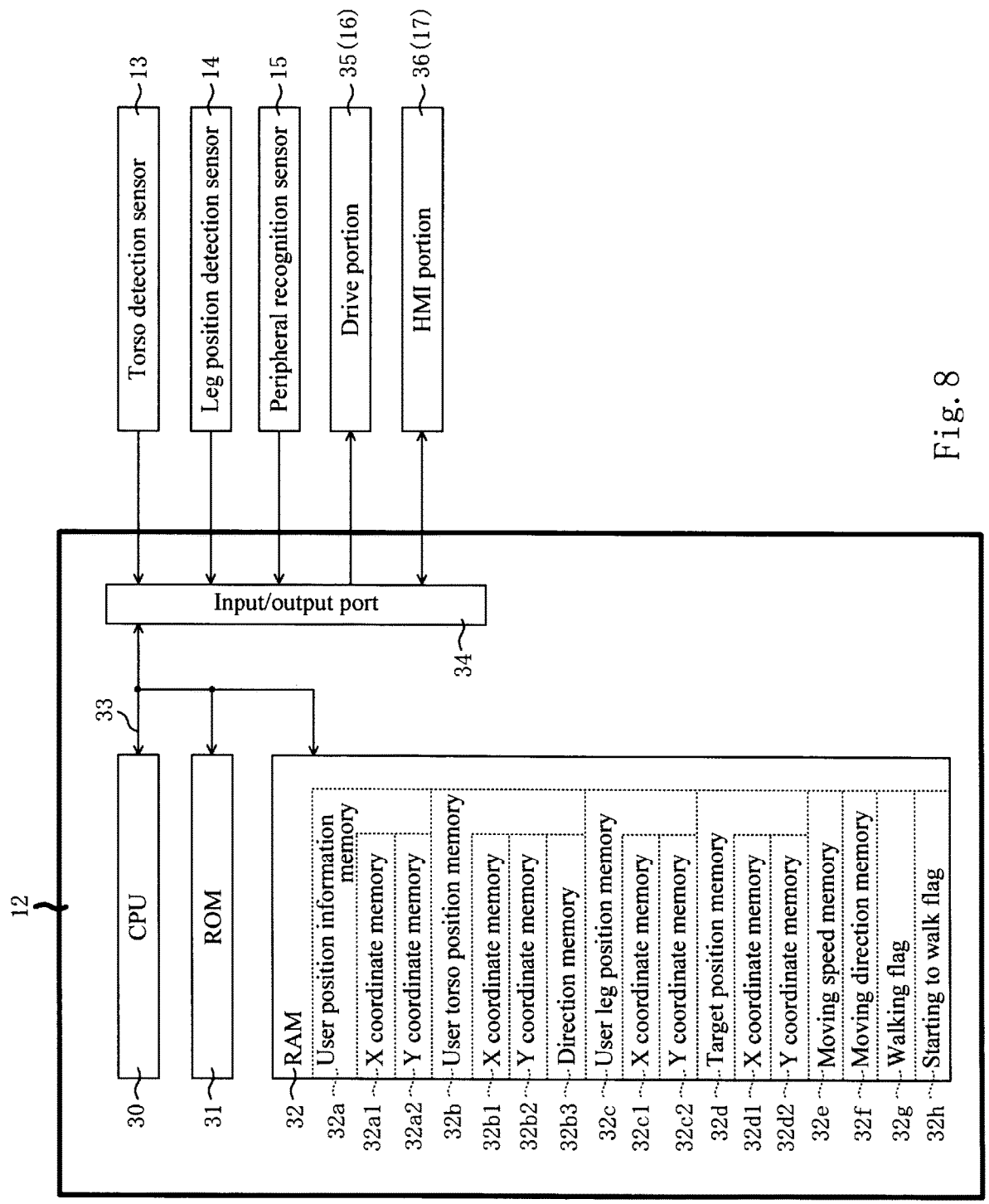
FIG. 8 is a block diagram showing an electrical constitution of the moving body in a second embodiment.

FIG. 8 is a block diagram showing an electrical constitution of the moving body 10 in the second embodiment. Against the first embodiment mentioned above, constitution of the RAM 32 of the control portion 12 is different.

In the control portion 12 of the second embodiment, a direction memory 32b3 is added to the user torso position memory 32b. In the direction memory 32b3, a direction (unit: radian) in the torso position of the user 20 obtained from the torso detection sensor 13 is stored. The coordinate is the above-mentioned moving body coordinate system (coordinate system in which center C of the moving body 10 is set to origin (0, 0)). When the control portion 12 is powered on, the value in the direction memory 32b3 is cleared to "0". In the direction memory 32b3, concerning the image including the AR marker 21 obtained from the torso detection sensor 13, a relative angle for the position of the moving body 10 and the torso position of the user 20 calculated in the control portion 12 based on an inclination of the AR marker 21 is stored.

Next, with reference to FIGS. 9 and 10, processes executed by the CPU 30 of the control portion 12 will be described. The processes from S4 to S19 are as same as the processes of FIG. 3 in the first embodiment mentioned above, therefore description thereof will be omitted.

Figure 9:
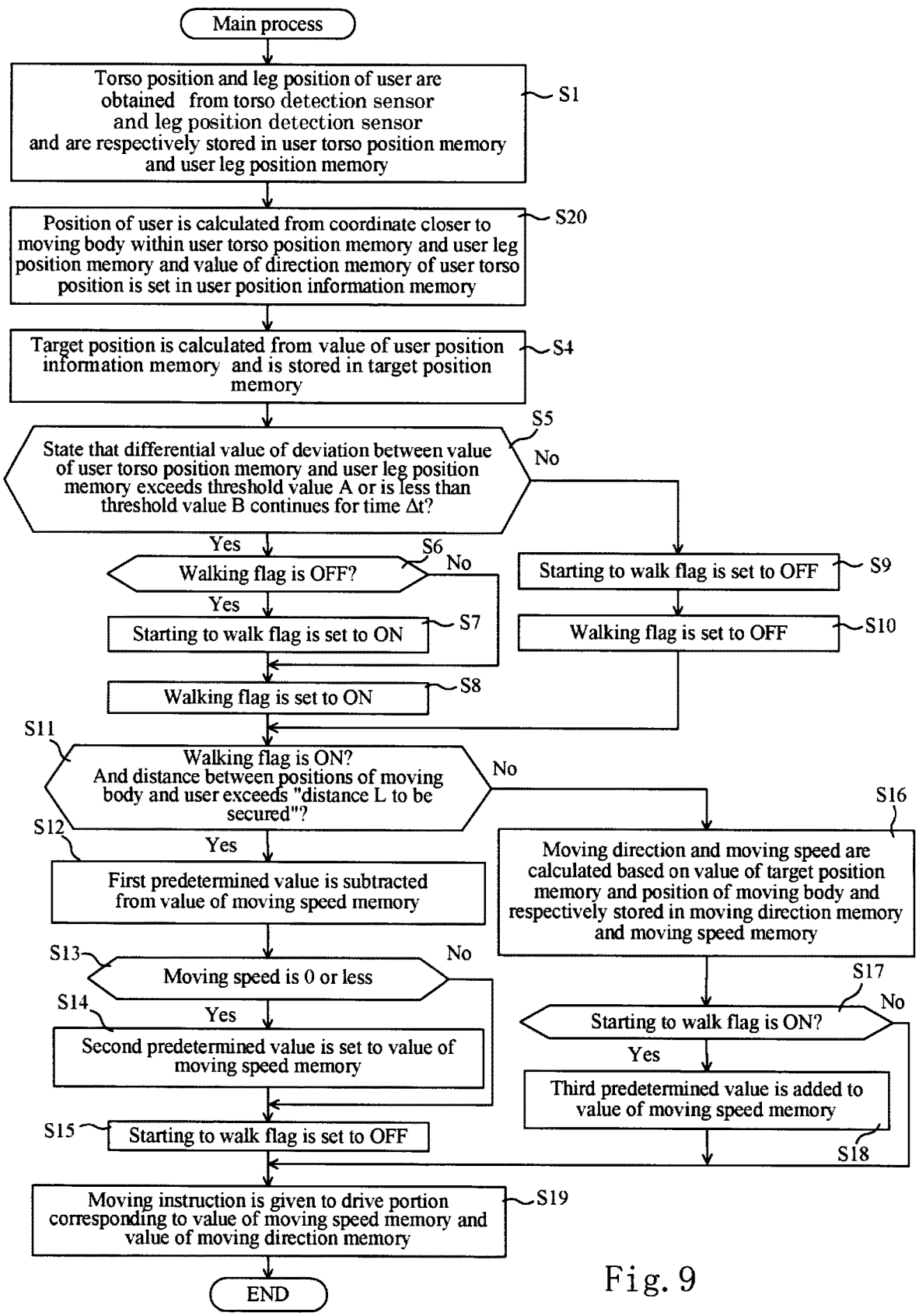
FIG. 9 is a flowchart of main process in the second embodiment.

FIG. 9 is a flowchart of the main process in the second embodiment. In process of S1, the torso position and the leg position of the user 20 are obtained and are respectively stored in the user torso position memory 32b and the user leg position memory 32c. In the user torso position memory 32b, in addition to the X coordinate and the Y coordinate, the relative angle of the moving body 10 and the position of the torso of the user 20 is further obtained and this is stored in the direction memory 32b3. The position of the user 20 is calculated from the coordinate closer to the moving body 10 within the user torso position memory 32b and the user leg position memory 32c and the value of the direction memory 32b3 and such position of the user 20 is stored in the user position information memory 32a.

Here, calculation method of the position of the user 20 will be described by using FIG. 10. Description of the portions as same as those in the first embodiment shown in FIG. 4 will be omitted.

Figure 10:
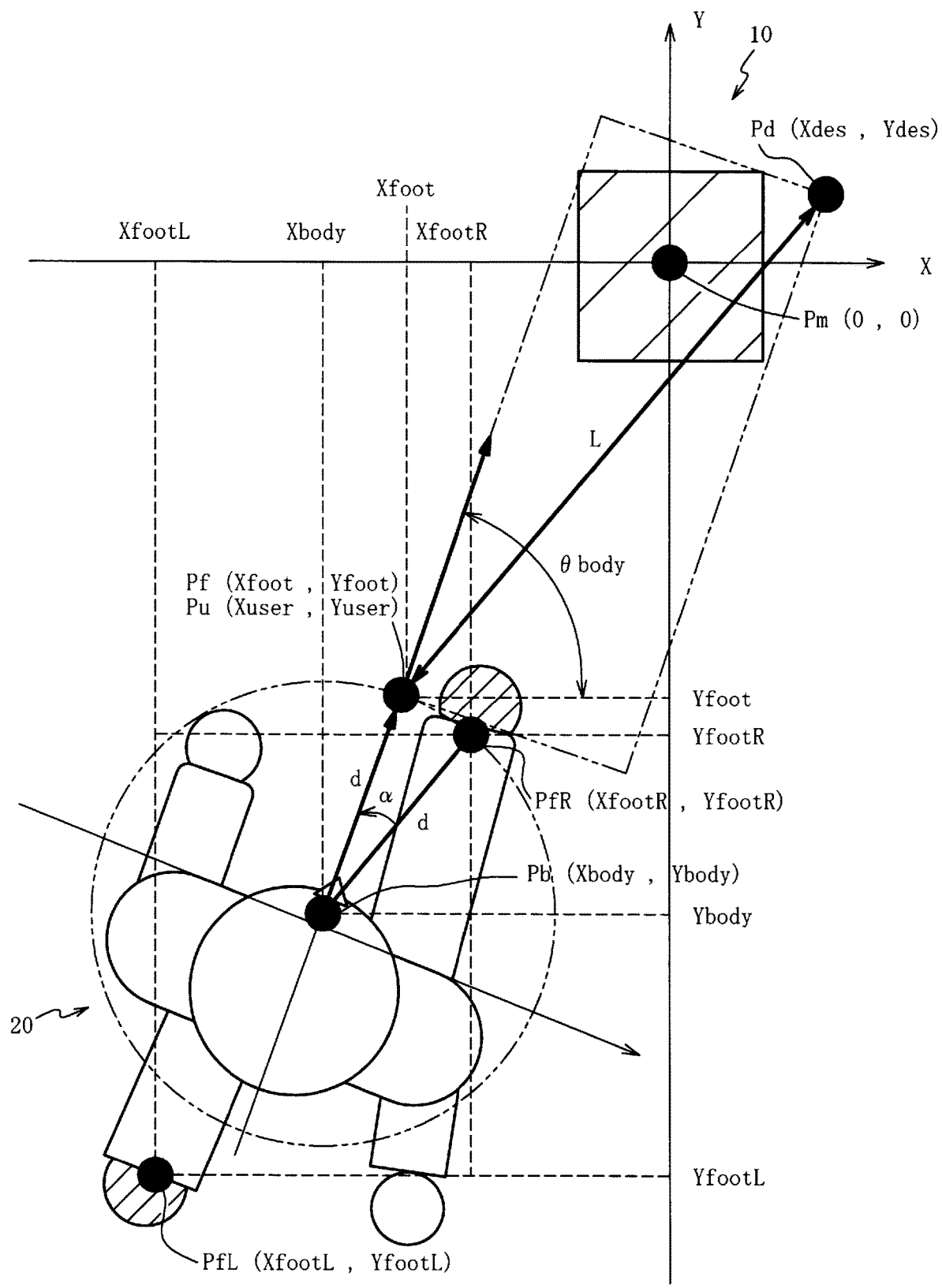
FIG. 10 is a view to explain a user position determined in step S20.

FIG. 10 is a view to explain the position of the user 20 determined in S20. θbody is the relative angle of the moving body 10 and the position of the torso of the user 20 and this value is stored in the direction memory 32b3. At the time of FIG. 10, the coordinate closest to the moving body 10 is the coordinate (XfootR, YfootR) of the right leg among the position of the torso of the user 20, the coordinate of the right leg and the coordinate of the left leg. First, a line segment connecting the PfR and Pb is obtained. Length of this line segment is supposed to d. The line segment d is rotated and moved to a position where the relative angle of the line segment d and the moving body 10 becomes θbody, that is, the line segment d is rotated and moved around the center Pb by angle α. This rotated and moved position Pf is set to the position Pu of the user 20 and the coordinate (xfoot, Yfoot) are respectively stored in the X coordinate memory 32a1, the Y coordinate memory 32a2 of the user position information memory 32a (S20).

As mentioned, movement control is conducted by detecting the torso direction of the user 20 by the torso detection sensor 13, determining the target position in the right-left direction of the moving body 10 and the moving direction of the moving body 10, considering the direction of the user 20. Therefore, the moving body 10 always positions in the constant direction when seeing from the user 20. Thereby, even in a case that the user 20 changes direction, the moving body 10 can be moved in the direction to which the user 20 faces and to the position not to get in the way.

As mentioned in the above, according to the moving body 10 of the second embodiment, as the coordinate of the position of the user 20 utilized for movement control of the moving body 10, it is utilized either one coordinate closer to the moving body 10 within the torso position and the leg position of the user 20 and such coordinate is rotated and moved to the direction to which the torso position of the user 20 faces. Thereby, the moving body 10 can be followed and moved to the user 20 in front of the user 20 while appropriately retaining the distance between the moving body 10 and the user 20.

Although the present invention is described based on the embodiments, the present invention is not limited to the above-mentioned embodiments and it will be easily guessed that various improvements and changes can be done within a scope of the present invention so as not to deviate from the scope of the present invention.

In the present embodiment, if the user 20 is in the walking state and the distance between the moving body 10 and the user 20 exceeds the distance L to be secured (S11: Yes), the first predetermined value is subtracted from the moving speed of the moving body 10 (S12), thereby the moving speed of the moving body 10 is decelerated. However, instead of this, the moving speed of the moving body 10 may be decelerated by ½ or ⅓. Further, the first predetermined value to be subtracted is not necessarily a fixed value and may be constituted as a predetermined relative speed against the moving speed of the moving body 10. Furthermore, if the user 20 is in the walking state and the distance between the moving body 10 and the user 20 exceeds the distance L to be secured (S11: Yes), the target position of the moving body 10 may be set to a position closer than the original target position, and according thereto, the moving speed of the moving body 10 may be set to a speed slower than usual.

Similarly, the second predetermined value utilized in the process of S14 is not necessarily a fixed value and may be constituted as a predetermined relative speed against the moving speed of the moving body 10.

Further, if the user 20 is in the starting to walk state (S17: Yes), the third predetermined value is added to the moving speed of the moving body 10 (S18) and the moving speed of the moving body 10 is accelerated. However, instead of this, the moving speed of the moving body 10 may be accelerated to 1.5 times, 2 times, 3 times. Further, the third predetermined value to be added is not necessarily a fixed value and may be constituted as a predetermined relative speed against the moving speed of the moving body 10. Further, if the user 20 is in the starting to walk state (S17: Yes), the target position of the moving body 10 may be set to a position more distant than the original target position, and according thereto, the moving speed of the moving body 10 may be set to a faster speed than usual.

In the present embodiment, detection of the torso of the user 20 is conducted by detecting the AR marker 21 provided on the torso portion of the user 20. However, it is not necessarily limited to this, for example, the obtained image from the torso detection sensor 13 may be analyzed and position and direction of the torso may be detected. Thereby, it is not necessary to provide the AR marker 21 on the user 20. Further, a skeleton model may be formed from three-dimensional distant image and the position and direction of shoulder or waist may be obtained. In this case, if obtaining range of the image is whole body of the user 20, the position of knee can be obtained from the skeleton model, thus the leg position detection sensor 14 becomes unnecessary.

Further, the image including whole upper body of the user 20 is obtained by the torso detection sensor 13 and the image from which arm portions of the user 20 are removed by image processing is recognized as the torso of the user 20, thereby the torso position of the user 20 may be detected. Thereby, in a case that the user 20 moves arms irrelevant of his movement, the moving body 10 can be moved to an appropriate position against the user 20 in front of the user 20 and can be followed to the user 20, without being misled by movement of arms.

Further, as the user detection device, an image of whole body of the user 20 may be obtained, the torso and the leg of the user 20 may be distinctly recognized by image processing, thereby the torso direction and position of the user 20 and the leg position of the user 20 may be detected.

Based on the differential value of deviation of the torso position and the leg position, the walking state is judged. However, it is not necessarily limited to this. For example, in a case that difference from the previous values of the torso position, the leg position is more than a predetermined value, it may be judged as the walking state.

The invention claimed is:

1. A moving body following a user in front of the user, the moving body comprising:
  a motor configured to drive a set of wheels to move the moving body;
  a plurality of cameras configured to capture images and detect the user, including a torso and a leg of the user; and
  a controller programmed to:
    determine a distance between the moving body and the torso, and a distance between the moving body and the leg, based on the images captured by the plurality of cameras,
    compare the distance between the moving body and the torso to the distance between the moving body and the leg, and set a reference position for the user based on a shorter distance from among one of the distance between the moving body and the torso or the distance between the moving body and the leg, and,
    set a target position for the moving body to be located a predetermined distance from the reference position, and
    control the motor so as to move the moving body to the target position.

2. The moving body according to claim 1,
wherein the plurality of cameras detects a direction of the torso of the user, and
wherein the controller sets a left-right direction of the target position based on the direction of the torso detected by the plurality of cameras, and sets a front-back direction position for the target position based on the one of the torso and the leg that has a shorter distance from the moving body.

3. The moving body according to claim 1, wherein the plurality of cameras detects a direction of the torso of the user, and the controller controls a moving direction of the moving body based on the direction of the torso of the user.

4. The moving body according to claim 1,
wherein the plurality of cameras detects a pair of arms of the user, and
wherein the controller conducts movement control of the moving body without using information of the arms detected by the plurality of cameras.

5. The moving body according to claim 1,
wherein the plurality of cameras detects starting to walk of the user, and
wherein the controller sets, after the starting to walk of the user is detected, a moving speed of the moving body based on information of a position of the moving body and information on the target position of the moving body.

6. The moving body according to claim 5, wherein the plurality of cameras detects the starting to walk of the user in a case that a differential value of position deviation of the torso and the leg of the user exceeds a predetermined first threshold value.

7. The moving body according to claim 1,
wherein the plurality of cameras detects walking of the user, and
wherein the controller decreases a moving speed of the moving body if (i) the walking of the user is detected by the plurality of cameras and (ii) a distance between the moving body and user exceeds a distance between the target position and the user.

8. The moving body according to claim 7, wherein the plurality of cameras detects the walking of the user in a case that a differential value of position deviation of the torso and the leg of the user exceeds a predetermined second threshold value for a predetermined period.

* * * * *